United States Patent

[11] 3,582,612

[72] Inventor  Roman Siemianowski
              1647 N. Pauline St., Chicago, Ill. 60622
[21] Appl. No. 818,170
[22] Filed     Mar. 21, 1969
[45] Patented  June 1, 1971

[54] AUTOMATIC ELECTROLYTIC DEVICE TO LIMIT ICE FORMATION IN GUTTERS AND DOWNSPOUTS
16 Claims, 13 Drawing Figs.

[52] U.S. Cl. ..................................... 219/213,
     200/61.04, 219/284, 219/538
[51] Int. Cl. ............................................. H05b 1/00
[50] Field of Search............................................. 219/201,
     213, 280, 284, 538; 200/61.04, 61.05, 152.4;
     340/234

[56]              References Cited
              UNITED STATES PATENTS
3,164,820  1/1965  Hulett ........................ 340/234

| 3,233,078 | 2/1966  | Siemianowski | 219/213    |
| 2,470,066 | 5/1949  | Calabrese    | 200/152.4X |
| 2,623,969 | 12/1952 | Lyle         | 200/152.4  |
| 3,233,078 | 2/1966  | Siemianowski | 219/213    |
| 3,245,068 | 4/1966  | Wegryn et al.| 219/284UX  |

FOREIGN PATENTS 1,433,375  2/1966  France ........................ 200/61.05

Primary Examiner—J. V. Truhe
Assistant Examiner—C. L. Albritton
Attorney—Rummler & Snow ABSTRACT: A water-sensing switch which energizes heating cables or tapes placed in gutters and downspouts to prevent ice overflow, which switch is part of a circuit including a transformer, a relay, a circuit breaker and a current supply to said gutters and downspouts.

The present invention is directed to an electrolytic switch and associated electrical means, which is an improvement on the switch means and associated structures shown in my U.S. Pat. No. 3,233,078, granted Feb. 1, 1966.

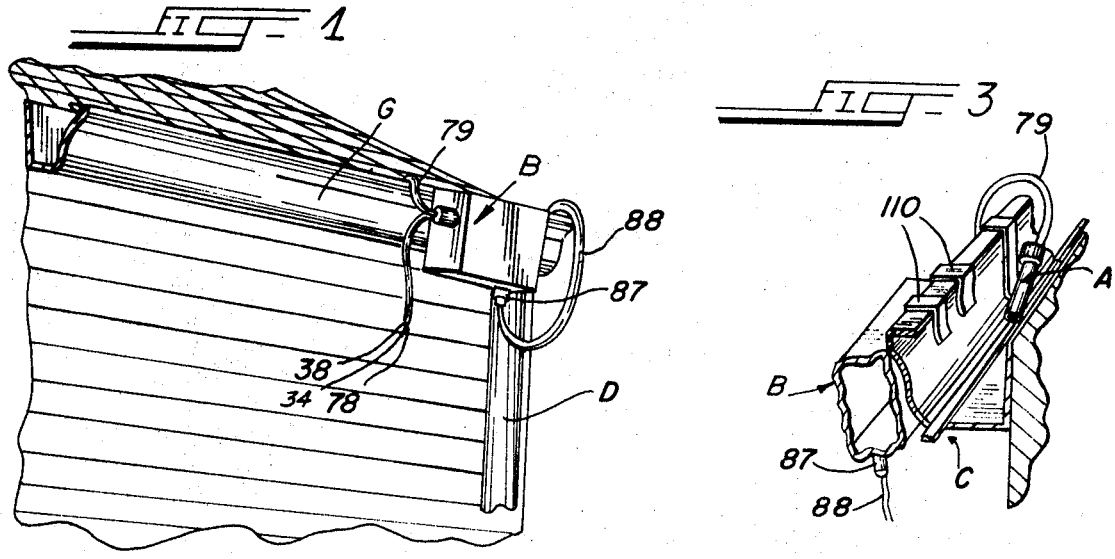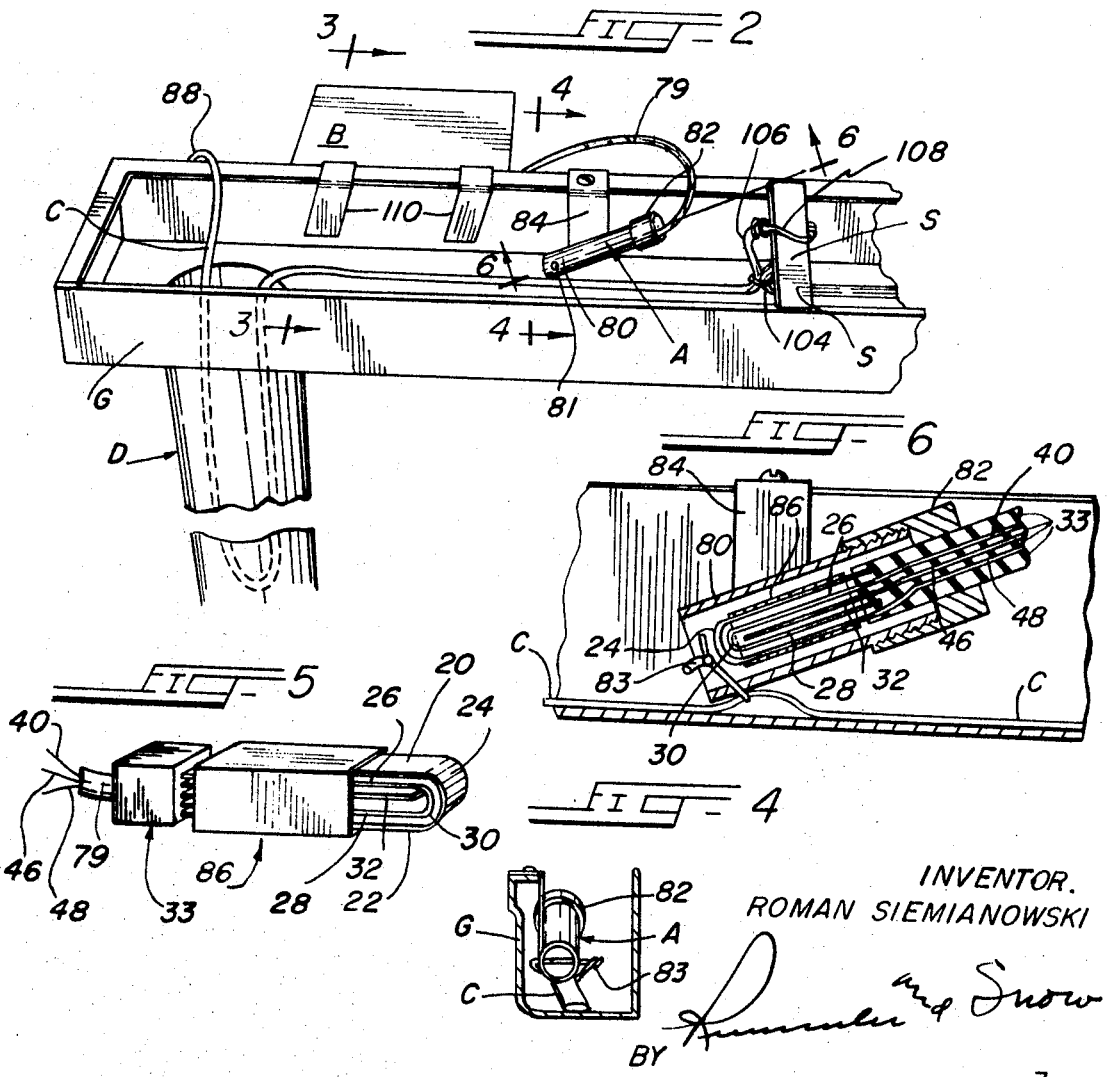

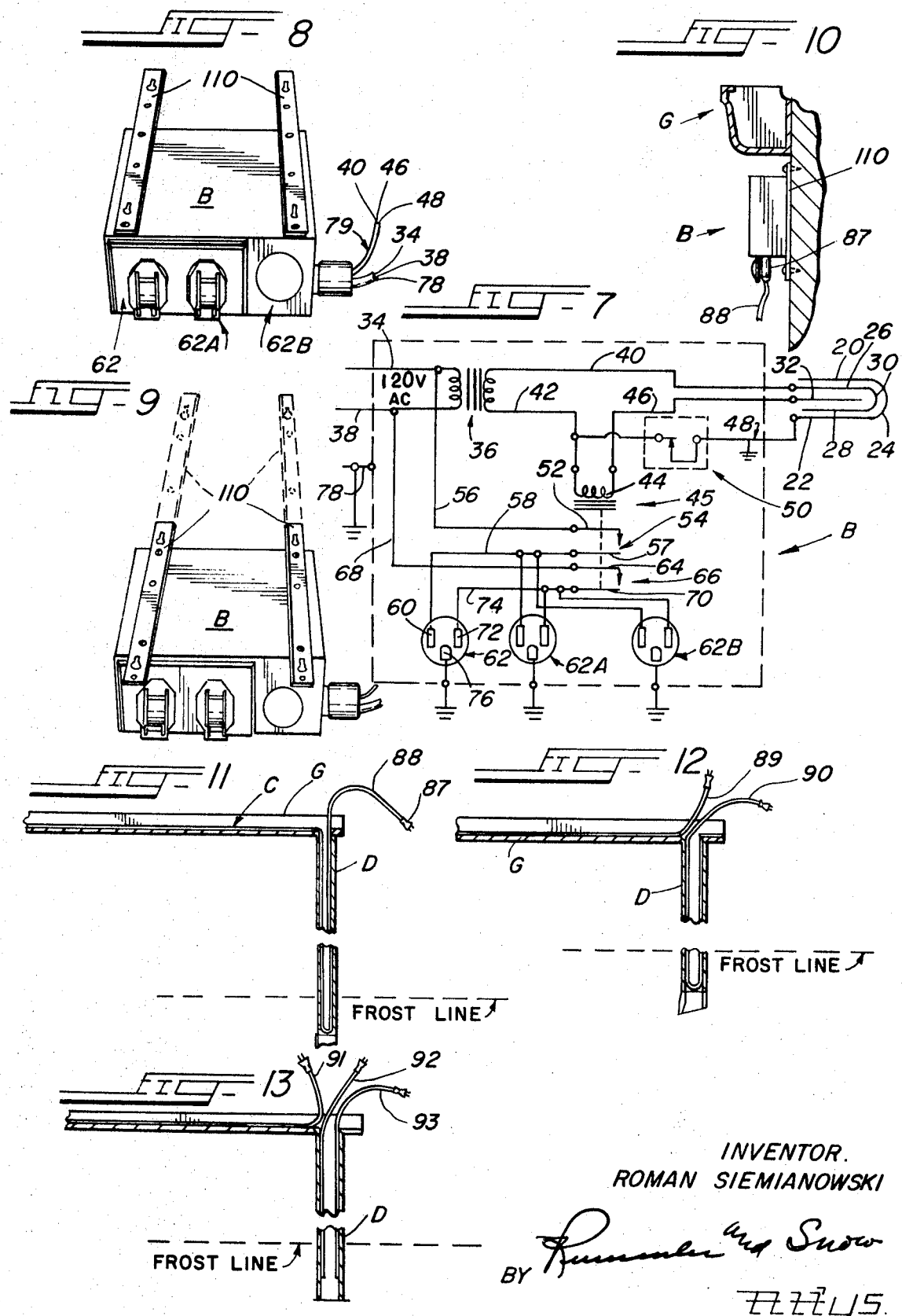

AUTOMATIC ELECTROLYTIC DEVICE TO LIMIT ICE FORMATION IN GUTTERS AND DOWNSPOUTS

SUMMARY OF INVENTION

The invention consists of a water-sensitive switch structure and associated electrical mechanism for energizing heating cables normally lying in a gutter or hanging in a downspout. The invention contemplates the water-sensitive switch to be housed in an open-ended tube, which will be anchored angularly within the gutter so that the open end of the tube will be closely adjacent the bottom wall of the gutter. The switch will be connected by electrical cable to a control box containing the associated electrical components, which box may be located on or near the gutter. In the control box the source of 120-volt alternating current will be connected to the contacts of a two-pole relay for energizing the heating cable. The power source will be connected also to the primary winding of an isolation transformer. The secondary winding of said transformer shall provide a power source that is neutral with respect to ground for the operation of the water-sensing switch and the relay connected thereto.

Further, it is an object of this invention to provide a water-sensing switch of small size, so that the gutter will not be unduly obstructed. Another object is to provide a means of heating water within the switch to increase the conductivity thereof. Another object is to provide a heated water-sensing switch that will operate economically by drying rapidly and deenergizing the heating cable quickly when water recedes. Another object is to provide a water-sensing switch formed of a series of plates closely positioned together so that a capillary action will occur when rising water just touches the tip of the switch to activate the switch.

BRIEF DESCRIPTION OF DRAWINGS

FIG. 1 is a perspective view, with parts broken away, of a corner of a house, showing a gutter, downspout and the electrical components housing anchored to the gutter.

FIG. 2 is a perspective view showing my electrolytic switch positioned in the gutter.

FIG. 3 is a partial perspective and cross-sectional view taken on line 3-3 of FIG. 2.

FIG. 4 is a cross-sectional view taken on line 4-4 of FIG. 2.

FIG. 5 is a perspective view of the preferred form of the electrolytic switch.

FIG. 6 is a cross-sectional view taken on line 6-6 of FIG. 2.

FIG. 7 is a drawing of the electrical circuit.

FIG. 8 is a perspective view of the container for electrical components and shows one manner of attaching mounting straps to the container.

FIG. 9 is a perspective view similar to FIG. 8 but illustrates mounting straps attached to the back of the container in another manner; also in dash lines the straps are shown attached to the container in still another manner.

FIG. 10 is a side elevation view of the device of FIG. 9 mounted on the sidewall of a building, with parts in cross section.

FIGS. 11, 12 and 13 are cross-sectional views showing the various ways to mount heating tapes in downspout and gutter.

DETAIL DESCRIPTION

Referring to the drawings, my invention is designed to limit ice formation and blockage in gutter G and downspout D and to prevent icicles hanging from the gutter and other deleterious effects of ice accumulation, and comprises an electrolytic switch A, electrical components (see FIG. 7) in housing B and heating cable C or tape for gutter G and downspout D.

In FIGS. 5 and 6 I have illustrated the preferred embodiment of my electrolytic water-sensitive switch which comprises three thin metal plates, preferably of stainless steel or other suitable metal, two of which are bent back upon themselves in U-shape form to surround a third plate of straight form. The outer U-shaped metal plate comprises a pair of legs 20—22 connected by an arcuate wall 24. The inner U-shaped metal plate comprises a pair of legs 26—28 connected by arcuate wall 30. The inner U-shaped plate is positioned wholly within the outer plate, and all plate walls are slightly spaced from each other. A third plate 32 is of straight form and is positioned within and slightly spaced from legs 26—28 and arcuate portion 30 of the inner U-shaped plate. Thus all plates and arcuate portions are slightly spaced from each other, yet close enough so that water touching the plate edges will be drawn up by capillary action to effect an electrolytic switch action in the presence of an electric current. All plate and leg components of the switch assembly are insulated from each other and covered at the wired end by a waterproof dielectric material 33. Finally, the exposed, functional tip of the switch assembly is partially covered by a waterproof dielectric sleeve 86.

Referring to FIG. 7, the source of current is 120-volt alternating current, with one line 34 connected to one side of the primary coil of an isolation transformer 36, while the other line 38 is connected to the other side of the primary coil. The transformer 36 has preferably 120 volts on both the primary and secondary coils with a 35-volt-ampere (35-watt) output.

My electrolytic device is interposed as a switch for relay 45 in the circuit comprised of secondary leads 40—42 and wire 46 connecting to relay coil 44. Secondary lead 42 is connected directly to one side of coil 44 of relay 45. Secondary lead 40 is connected to the electrolytic switching plate 26—28, while the complementary switching plate 32 is connected by wire 46 to the remaining side of relay coil 44. The transformer secondary lead 42 is connected also to heater plate 20—22 through a self-resetting thermal circuit breaker 50 of the type disclosed in U.S. Pat. No. 2,952,758, or a similar device, and wire 48. Wire 48 is grounded as shown.

In fig. 7, it is seen that the transformer secondary, by being connected to adjacent plates 20—22 and 26—28, is vulnerable to a short circuit, should one plate touch the other. In addition, the secondary can easily be overloaded, if water of a highly conductive nature should enter between plates 20—22 and 26—28. To prevent the transformer from overheating and burning out, the self-resetting thermal circuit breaker 50 is interposed between secondary lead 42 and heater plate 20—22.

Thus, in the presence of water, electric current flows from switching plate legs 26—28 to switching plate 32, energizing coil 44 of relay 45. At the same time, in the presence of water, electric current flows from switching plate legs 26—28 to heater plate legs 20—22, greatly heating the water there between, also heating the entire switch body and water between switching plate legs 26—28 and switching plate 32.

Referring to FIG. 7, it is seen that satisfactory operation of the relay coil 44 depends on the conductivity of the water between plate 32 and legs 26—28. In my application of the electrolytic switch, the water encountered is a rather poor conductor, for two reasons: first, being of atmospheric origin, it is poor in ions; second, being quite cold, the degree of ionization is minimal. However, the conductivity can be increased by warming the water. This is accomplished by incorporating a third plate 20—22 in the switch assembly for the purpose of passing an electric current through water to plate 26—28 thus heating the water and adjacent switch components.

Heating of the switch results in a second benefit—rapid drying of the switch plates and minimum "overrun" operation of heating cable after water drains from the switch area.

The function of the dielectric sleeve 86 in FIGS. 5 and 6 is now being explained, since it relates to conserving the heat developed by plates 26—28 and 20—22. During complete submersion of the entire switch body in icy water, as may occur during a rapid thaw, most of the heat developed is immediately dissipated by water convection upward between the plates. The result is that a fully submerged switch is colder and less conductive than a switch just touching water, and may fail to keep relay coil 44 sufficiently energized to keep switches 54 and 66 closed. The sleeve 86 has a diameter to fit snugly over the exposed switch plates and has a length less than the exposed plates. The sleeve is applied over the middle of the exposed switch length, so that water may enter between the plates at the bottom end of the sleeve while air and gases vent at the top end. Thus, while the switch is submerged in icy water, the sleeve reduces heat lost by convection and increases the temperature of the switch body, resulting in optimum conductivity and proper operation of the relay.

Referring further to FIG. 7 to explain the wiring of relay 45, the stationary contacts 52 and 64 of switches 54 and 66 are connected respectively by leads 56 and 68 to power supply wires 34 and 38, directly ahead of transformer 36. The movable contact arms 57 and 70 are connected by leads 58 and 74 to prongs 60 and 72 of conventional receptacle 62. The third prong 76 of the receptacle is connected to ground.

The housing B is also grounded as at 78.

Thus, in the presence of the minutest amount of water closing the small gap between plate 32 and switching legs 26—28, the coil 44 of relay 45 will be energized, and the core thereof will effect closing the switches 54 and 66 to energize the heating cable C when its plug 87 is electrically connected to receptacle 62.

In FIG. 6, the electrolytic switch is shown positioned medially within a tube 80, by cap 82 having its closed end apertured which supports the switch as well as the three lead wires 40, 46 and 48 where they are connected to plate 32 and legs 22 and 26, with the insulation 33 there between as aforesaid. These lead wires are encased in cable 79 and connected to the circuit of FIG. 7 in housing B.

In FIGS. 2, 3 and 6, the switch housing A is positioned in the gutter at the outer sidewall thereof by strap 84, which is anchored to the lip of the gutter and to tube 80. The switch housing is preferably located near the downspout, because this is the lowest level of the gutter and accumulating water can first be detected here. As shown in FIG. 2, the tube 80 is fixed angularly so that the open end of tube 80 points toward the bottom wall of the gutter and toward the inlet to downspout D. The angle of mounting is less than 90° vertical, so that freezing water will not seal the open bottom end of tube 80 before the electrolytic switch can be activated. The angle of mounting is also greater than 0° horizontal, so that water will drain completely from the interior of tube 80. Another function of angular, off-horizontal mounting is to prevent debris commonly found in gutters from clogging the orifice and interior of tube 80.

FIG. 6 shows the preferred mounting of the switch within the tube, with the open end of the tube 80 elevated a short distance above the gutter bottom to allow a minimal depth of water to exist in the gutter (as during a light rain or freely draining thaw) without wetting and activating the switch needlessly. To assure that water will drain away from the switch along a heated path, the gutter-heating cable or tape C is brought under the switch housing at its open end, as shown in FIGS. 2, 4 and 6, and is secured thereto by an insulated tie wire 83 inserted through opposed holes 81, which are drilled through the walls of tube 80 as shown.

FIGS. 11, 12 and 13 show that the downspout D is furnished with more heating cable than gutter G. This is necessary because the downspout contents are frequently colder than gutter contents when a melt begins to accumulate in the gutter. First of all, water draining off the roof quickly warms the gutter ice to near 32° F., while the downspout ice cannot thus be warmed. Secondly, the sun warms the gutter and its contents, while the lower reaches of the downspout are often shaded by shrubbery or neighboring structures. The external heating of the gutter ice (by roof melt and sunlight) is thus balanced by increased internal heating of the downspout ice (by added heating cable).

There are several ways a second strand of heating cable or tape can be provided for the downspout to satisfy its greater heating requirement. Either one, two or three heating cables may be used for each gutter-downspout system. FIG. 11 shows how one heating tape or cable 88 is employed for both gutter G and downspout D. Here the portion of the cable near the plug is doubled up and inserted in the downspout so that it extends below the frost line. The rest of the cable is laid on the bottom of the gutter which drains into the downspout.

FIG. 12 shows how two heating cables 89 and 90 are employed. Cable 90 is extended doubled in the downspout D to below the frost line. The second heating cable 89 is stretched the length of the gutter and lies therein.

FIG. 13 demonstrates how three heating cables are employed—92 and 93 in the downspout, extended beyond the frost line, and 91 installed in the gutter only.

There is an economical advantage in using multiple tapes or cables. In case of failure or defect, a short heating tape costs less to replace than a long one.

Each heating cable or tape terminates in plug 87 for insertion in either of receptacles 62, 62A and 62B to form an electrical connection with the circuit of FIG. 7.

As seen in FIG. 2, it is preferred that heating cable in the gutter be tied at 104 40—form a loop 106, which is secured at the top to the usual gutter strap S by an insulated tie wire 108. This is done every 8 to 10 feet 26—gutter length primarily to allow water to reach the heating cable lying on the gutter bottom, regardless of the depth of ice overlying the cable, by means of drainage holes melted 20—the ice depth at each loop. Tying loops in this manner also prevents displacement of the cable by strong winds and retains cable in the desired position in the gutter.

The housing B may be positioned in several places—such as by attachment to the gutter proper (as shown in FIGS. 1, 2 and 3), or to the sidewall of the building (as shown in FIG. 10), or to the under side of the eaves (not shown). The housing may also be located within the building by extending the wiring from the housing to the electrolytic switch and to the heating cable. Attachment of the housing B is accomplished with a pair of spaced straps 110, which may be secured to the back of the housing in three ways.

FIG. 8 shows the top ends of the straps 110 extended beyond the top wall of the housing, while the lower ends are flush with the bottom wall. The extended ends of the straps are bent over the gutter lip for attachment to the gutter, as shown in FIGS. 1, 2 and 3.

In FIG. 9, the solid lines of the drawing show straps 110 anchored so that an equal portion of each strap extends beyond upper and lower walls of the housing. Screws are driven through the strap ends into a sidewall of the building (as shown in FIG. 3) or to the under side of the eaves (not shown) for attachment of the housing B to either wall or eaves.

In FIG. 9, the dash lines of the drawing show straps 110 anchored so that only one end of each strap is secured at the top wall of the housing. This method is for hanging the housing B on a half-round gutter, wherein the maximum extended length of each strap is folded over both lips of the gutter, bridging the gutter (not shown).

The operation of the heated electrolytic switch, when the power source has been connected to the circuit, is described as follows. Water which is prevented from flowing out of the gutter by snow, ice or slush will accumulate near the downspout until it touches wall 24 and wall 30 of the switch. Since the wall 24 is connected to the secondary of transformer 36 through heater leg 22, wire 48, circuit breaker 50 and wire 42, and since wall 30 is also connected to the secondary of transformer 36 through switching leg 26 and wire 40, an electric current passes through the water touching walls 24 and 30, heating the water and agitating it, so that it is quickly drawn by capillary action into part or all of the space between legs 20—22 and 26—28. While being agitated by the boiling action between the U-shaped heater plates 20—22 and 26—28, water readily infiltrates between switching plate 32 and legs 26—28, completing the circuit energizing the relay coil 44, closing switches 54 and 66, energizing receptacles 62, 62A and 62B and heating cable plugged thereinto. Even though only partly wetting the switch plates, water reaches its optimum conductivity by the rapid heating, thus effecting early operation of relay 45.

Should the electrolytic switch be inundated by ice-cold water, the sleeve 86 conserves heat within the switch body by restricting convection, thereby assuring maximum conductivity for operating relay 45.

Now, therefore, as long as there is water between the switch plates, the relay remains closed, and heating cables connected to all or any of receptacles 62, 62A and 62B will be energized to melt a drainway through ice and slush. When sufficient melting is accomplished, water in the gutter exhausts itself by draining into the downspout. When water in the gutter recedes to a level lower than that of the switch plates, most of the water within the switch drops out, because it is heated and has a low surface tension. Any remaining water in the switch is rapidly boiled away between heater legs 20—22 and 26—28. Remnant moisture between switch plate 32 and legs 26—28 is evaporated by electric current flowing through relay coil 44. As water between the switch plates vaporizes, current to the relay coil gradually diminishes, until the coil can no longer hold the switches 54 and 66 closed. Thereupon contacts 52—57 and 64—70 spring open, deenergizing the heating cables connected to receptacles 62, 62A and 62B.

The automatically reset thermal circuit breaker 50 in FIG. 6 protects the transformer 36 from burning out, should a short circuit or prolonged overload occur in the heater section of the switch—that is, between heater legs 20—22 and 26—28. This type of circuit breaker also adapts the fixed area of my electrolytic switch plates to the varied and varying conductivity of water encountered in practice.

The conductivity of water from melted snow varies considerably at different times and places. The least conductive water comes from snow melted shortly after falling through clean air on a recently rain-washed roof and collected in a clean gutter. The most highly conductive water comes from snow melted several days after falling through dusty, polluted air on a dusty roof and collected in a debris-laden gutter.

How the self-resetting thermal circuit breaker adapts my electrolytic switch to the unpredictable and unstable conductivity of water from melted snow will now be explained. My device is designed to operate satisfactorily in clean atmospheric water requiring larger heater and switching plate areas than unclean atmospheric water. In clean water, the heater legs 20—22 and 26—28 draw less power than the rated capacity of the transformer, and thus the switch is heated constantly to maintain optimum switch conductivity. However, when the water is much more conductive, the switch operates the relay satisfactorily without requiring heat. Nevertheless, the U-shaped heater plates of the switch do become activated and, because of the greater conductivity of the water, draw more power than the transformer rating. The resultant overload heats the circuit breaker until it trips open the switch-heater circuit. On cooling, the circuit breaker resets itself, closing the switch-heater circuit. As long as water of the same conductivity is present, the circuit breaker will then operate the switch heater on a fairly regular "on-off" schedule, while protecting the transformer from overload damage.

Should the water permeating my switch suddenly become less conductive, then the switch-heater power consumption and overload is reduced, causing the circuit breaker to increase the switch heat "on" time in relation to the "off" time. Thus, the self-resetting circuit breaker performs two functions—protects the transformer and effectively varies the amount of switch heating to suit the conductivity of the water.

It should be obvious that the switch plates shown in FIGS. 5 and 6 may be rotated 90° and be equally effective.

A thermostat exposed to outdoor temperature may be interposed between power supply wire 38 and its connection within housing B to the circuit of FIG. 7 for the purpose of withholding power to the circuit when and as long as ambient air temperature is above approximately 36° F. Thus, during spring, summer and fall, when severe rainstorms occasionally pour enough water into the gutter to wet the electrolytic switch, neither the switch nor any part of the circuit of FIG. 7 will be energized as long as the ambient air temperature is above approximately 36° F. The circuit will be "on power" only when icing conditions exist.

I claim:

1. In combination with a drain gutter having side and bottom walls and having an electric heating tape therein connectable with a source of electric energy in an electric circuit for preventing ice overflow in said gutter, said electric circuit comprising relay means for connecting said source to said heating tape, an electrolytic switch in said circuit and being sensitive to the presence of water, said electrolytic switch comprising an outer U-shaped plate having a pair of spaced legs and connector wall, an inner U-shaped plate wholly contained within said outer plate, having a pair of spaced legs and connector wall, a central plate positioned interiorly of said inner plate, each of the legs of said plates and connector walls being spaced away from, but in close proximity to, each other, said central and said inner plate being inserted in said electric circuit in series with said relay means, said outer and said inner plate being inserted in series with an overload circuit breaker in said electric circuit; a housing for said switch having an open end, said electrolytic switch and housing being positioned in said gutter whereby said open end portion or said housing lies adjacent the bottom wall of said gutter for allowing water access to said switch by water rising in said gutter.

2. The combination according to claim 1 wherein said housing is positioned angularly downward in said gutter, adjacent the side gutter wall.

3. The combination of a drain gutter and a drain downspout therefor having an electric heating element in both connectable by switching means to a source of electrical energy for preventing ice overflow therein, an electric circuit having a relay for actuating said switching means, an electrolytic switch positioned in said drain and being sensitive to the presence of water for closing said circuit, said circuit comprising the secondary of an isolation transformer and said source being electrically connected to the primary thereof, said electrolytic switch comprising a series of spaced legs closely positioned in a stack and dielectrically separated, a first group of said legs being inserted in said circuit and a second group of said legs being inserted in series with an overload circuit breaker in said circuit, a housing for said switch device having one end open to the atmosphere, said housing positioned angularly downward in said gutter with the open end adjacent the bottom wall of the gutter, whereby water from the atmosphere draining in said gutter and downspout will be capillary action close said switch to complete the circuit for energizing said heating elements.

4. The device according to claim 3 wherein a self-resetting thermal circuit breaker is positioned in the line between said second group of legs and said one side of said relay coil.

5. The device according to claim 4 wherein the open end of said housing is removably secured to the heating tape lying in said gutter.

6. The device according to claim 5 wherein the closing of the switch in the presence of water will make a heater leg of one of the legs of said first group of legs and will make a heater leg of one of said second group of legs whereby said heater legs boil the small quantities of water left in the switch, thus drying the switch and causing it to open when water is no longer in contact with the switch device.

7. In combination with a drain gutter having an electric heating element connectable with a source of electric energy in electric circuit relation for preventing ice overflow in said gutter, an electrical circuit, an electrolytic switch sensitive to the presence of water, a housing for said electrolytic switch enclosing said switch with one end open to the atmosphere and being positioned angularly downward in said drain gutter with the open end positioned adjacent the bottom of the gutter whereby water contacting said switch completes the formation of an electrolytic cell thereby closing said electric circuit for energizing said heating element, when water rises in said drain gutter, said switch comprising an outer U-shaped plate, an intermediate U-shaped plate wholly within said outer plate, and a flat plate wholly within said intermediate plate, each plate being slightly spaced apart from adjacent plates and all the plates dielectrically separated from each other at one end of each plate anchored at one end of said housing.

8. An electrolytic-responsive circuit for connecting a current source to electric connectors for applying current to heat-developing circuitry, comprising:

terminal means for connection to said current source, electrical connectors switching means inserted in a heating-current circuit connecting said terminal means to said connectors, relay means for operating said switching means to close said heating-current circuit, an electrolytic switch having a first pair of spaced plates inserted in a circuit coupled to said terminal means and including said relay, and a second pair of plates, and an overload circuit breaker inserted in a circuit coupled to said terminal means and including said second pair.

9. A circuit as claimed in claim 8, in which said electrolytic switch comprises three plates, the second one intermediate to the first and the third, the first and second plates forming said first pair and the second and third plates forming said second pair.

10. A circuit as claimed in claim 9, in which said second and third plates are U-shaped surrounding said first plate.

11. A circuit as claimed in claim 8, in which said plates are spaced to enable entry of water by capillary action therebetween.

12. A circuit as claimed in claim 8, in which said overload circuit breaker is an automatically resetting thermal circuit breaker.

13. A circuit as claimed in claim 10, in which said third plate is surrounded by a watertight dielectric sleeve covering the middle portion thereof.

14. A circuit as claimed in claim 8, in which said electrolytic switch is mounted in a tubular housing open at one of its ends.

15. A circuit as claimed in claim 14, in which said electrolytic switch is mounted on closure means at the other end of said housing.

16. A circuit as claimed in claim 8, in which a transformer couples said coupled circuits to said terminal means.

UNITED STATES PATENT OFFICE
CERTIFICATE OF CORRECTION

Patent No. 3582612      Dated June 1, 1971

Inventor(s) Roman Siemianowski

It is certified that error appears in the above-identified patent and that said Letters Patent are hereby corrected as shown below:

The following errors were committed by the Patent Office:

Applicant's address should read "1647 N. Paulina St.".

Col. 4, line 18, "10440" should read "104 to form".

Col. 4, line 20, "26" should be "of".

Col. 4, line 23, "20" should be "through".

Signed and sealed this 26th day of October 1971.

(SEAL)
Attest:

EDWARD M. FLETCHER, JR.      ROBERT GOTTSCHALK
Attesting Officer      Acting Commissioner of Patents